Patented Feb. 8, 1949

2,460,986

UNITED STATES PATENT OFFICE 2,460,986

DRYING EGGS

George Josh, Crown Point, Ind., and Louis A. Harriman, Chicago, and Ervin W. Hopkins, Hinsdale, Ill., assignors to Armour and Company, Chicago, Ill., a corporation of Illinois No Drawing. Application December 21, 1944, Serial No. 569,260

7 Claims. (Cl. 99—210)

This invention relates to the preparation of egg products, and more particularly to the preparation of dried egg products.

One of the objects of this invention is to provide new and improved dried egg products.

A more specific object is the provision of a new and improved method for producing dried egg whites.

A further object of the invention is to provide a new and improved method for the preparation of dried whole egg products.

Another object of the invention is to provide a new and improved method of preparing dried whole egg products whereby good results can be obtained without prior acidification and pasteurization of the materials being treated.

Another object of the invention is to provide a new and improved process of treating egg liquids preliminary to drying, whereby a neutralization step can be eliminated.

An additional object of the invention is the preparation of dried egg products substantially free from off flavors and odors. Other objects will appear hereinafter.

In accordance with the invention, it has been found that improved dried egg products are obtained by treating egg liquids with microorganisms of the yeast type, such as, for example, bakers' yeast, fermenting the egg liquid in the presence of the yeast, and thereafter drying the fermented mixture.

In the practice of the invention, Fleischman's bakers' yeast, which is a strain of *Saccharomyces cerevisiae*, was employed with excellent results. We believe that the off flavors and odors which commonly develop in dried egg products are due to the presence of reducing sugar content, principally in the whites and to a lesser extent in the yolks. With relatively small quantities of yeast the reducing sugars present in egg liquids were substantially depleted in a relatively short period of time. Palatability tests of dried egg products fermented in the presence of yeast, in accordance with the practice of the invention, were very favorable.

The invention will be further illustrated but is not limited by the following examples.

EXAMPLE I

Whole eggs inoculated with yeast were fermented and dried at a constant pH (pH 5), with the results given in the following table (Table 1):

Table 1

| Per cent Yeast By Weight | pH, Initial | Yeast[1] Count, Initial | pH, 2 hr. | Sugar, mg./100 2 hr. | Yeast Count, 2 hr. | pH, 4 hr. | Sugar, mg./100 4 hr. | Yeast Count, 4 hr. |
|---|---|---|---|---|---|---|---|---|
| 0   | 5.0 | none | 4.83 | 350 | none | 4.08 | 366 | none |
| .06 | 5.0 | 3.8  | 4.83 | 266 | 11.1 | 4.80 | 120 | 18.7 |
| .18 | 5.0 | 11.6 | 4.85 | 182 | 30.7 | 4.80 | 25  | 32.0 |
| .40 | 5.0 | 42.4 | 4.83 | 0   | 59.6 | 4.80 | 0   | 64.0 |

[1] The yeast count is given in number of yeast per field, using the Mallman method of slide preparation.

The tests reported in the Table 1 were conducted using 300 to 500 milliliter quantities in Erlenmeyer flasks. Incubation was at 22 to 23 degrees C.

From Table 1 it will be observed that with an inoculation of .18% by weight of moist yeast the sugar was practically depleted in four hours, with a 0.4% inoculation it was depleted in less than two hours.

EXAMPLE II

The effect of yeast in fermenting whole eggs, using a fixed quantity of yeast at varying pH values but with the total quantities and the inoculation temperatures the same as in Table 1, is illustrated by Table 2 as follows:

Table 2

| Percent Yeast By Weight | pH Initial | Yeast[1] Count, Initial | pH 1 hr. | Sugar, mg./100 1 hr. | Yeast Count, 1 hr. | pH 2 hr. | Sugar, mg./100 2 hr. | Yeast Count, 2 hr. | pH 3 hr. | Sugar, mg./100 3 hr. | Yeast Count, 3 hr. |
|---|---|---|---|---|---|---|---|---|---|---|---|
| 0  | 7.14 | none | 7.20 | 313 | none | 7.20 | 288 | none | 7.08 | 269 | none |
| .2 | 7.14 | 16.1 | 6.80 | 238 | 21.2 | 6.78 | 124 | 14.3 | 6.60 | 0   | 14.9 |
| .2 | 6.18 | 21.6 | 6.10 | 240 | 7.5  | 6.00 | 107 | 13.7 | 6.05 | 0   | 16.1 |
| .2 | 5.10 | 15.2 | 5.03 | 237 | 17.3 | 5.03 | 111 | 10.7 | 5.10 | 0   | 21.7 |

[1] The yeast count is given in number of yeast per field, using the Mallman method of slide preparation.

From Table 2 it will be seen that with .2% inoculation the reducing sugars were depleted in three hours or less, and that the pH did not substantially affect the fermentation rate, nor was the growth of the yeast substantially affected by a decrease in pH from 7.14 to 5.10. Thus, under the conditions described the sugars are substantially eliminated and at the same time the growth and development of yeast are not undesirably large.

EXAMPLE III

To 300 ml. of egg albumen 0.2% of Fleischman's yeast suspended in water was added and the mixture was fermented for 2 hrs. at 25° C. The pH before fermentation was 7.0 and the dextrose content 282 mg. of dextrose per 100 mg. of egg albumen. After 2 hours fermentation the dextrose content had been reduced to 0. The resultant product was then dried. A very satisfactory product was obtained.

Our tests have also demonstrated that the yeast inoculations are much more effective than inoculations with bacterial cultures such as *Streptococcus lactis*. For example, in one series of tests with yeast at pH 7 and an incubation temperature of 25 degrees C., the fermentation of whole egg in the presence of 0.2% yeast (added to 300 milliliters of liquid whole egg) substantially depleted the sugar content in two hours, while 1% of a culture of *S. lactis* required approximately 26 hours to substantially deplete the sugar content under the same pH and incubation conditions. A substantial depletion of the sugar content of egg yolk under similar conditions was also obtained.

In another series of tests the yeast depleted the sugar content of albumin in two hours, whereas a bacterial culture of *S. lactis* produced no reduction of sugar content in 4 hours and did not completely eliminate the reducing sugars in 26 hours.

In practicing the invention, the pH of the fermented product may be varied somewhat, depending upon the particular type of product and upon the purpose for which it is to be used. As illustrated in Tables 1 and 2, the results are obtained at an initial pH as low as 5, and also at an initial pH above the neutral point. In general, it is preferable to dry the egg products at a pH substantially near the neutral point, and it may sometimes be necessary to neutralize the fermented mixture by adding a suitable reagent to increase or decrease the acidity or alkalinity.

One of the advantages of the present invention is that the by-products of yeast fermentation cause very little, if any, change in acidity, and hence it is possible to carry out the fermentation process at a pH substantially near the neutral point and to eliminate the neutralization step, thereby simplifying the processing and improving the flavor.

Another advantage of this invention is that the rapidity of the fermentation causes the completion of the process before the growth of the adventitious flora becomes serious. It follows from this that preliminary acidification for the control of such flora is unnecessary. The same is true with respect to pasteurization, although it will be understood that either acidification or pasteurization can be employed in practicing the process.

An additional advantage of the invention is that moist yeast is readily available in a very convenient form, whereas bacterial cultures have to be propagated. Accordingly, it is possible, in the practice of this invention, to eliminate the propagation of a mother culture and bulk culture with savings in equipment, labor and risk of contamination.

Another advantage of this invention is that the growth of yeast by fermentation without artificial means of increased aeration favors the fermentation of the sugar rather than the multiplication in number of yeast cells, whereas fermentation by bacterial cultures is accompanied by very large increases in count.

A still further advantage of the invention is that the products have excellent palatability and are substantially free from yeast flavor.

This application is a continuation-in-part of our U.S. application Serial No. 556,892, filed October 2, 1944 now Patent No. 2,427,726.

Having thus described our invention, what we claim as new and desire to secure by Letters Patent of the United States is:

1. A process for preparing dried egg products comprising inoculating an egg white liquid with *Saccharomyces cerevisiae*, fermenting the inoculated mixture, and drying the fermented mixture.

2. A process for preparing dried egg products comprising inoculating a liquid egg product containing egg yolk with *Saccharomyces cerevisiae*, fermenting the inoculated mixture, and drying the fermented mixture.

3. A process for preparing dried egg products comprising inoculating a mixture of egg yolks and whites with *Saccharomyces cerevisiae*, fermenting the inoculated mixture, and drying the fermented mixture.

4. A process for preparing dried egg products comprising inoculating an egg liquid with *Saccharomyces cerevisiae* at an initial pH within the range from approximately 5 to 7, fermenting the inoculated mixture in the presence of the yeast, and drying the fermented egg mixture.

5. A process for preparing dried egg products comprising inoculating a mixture of egg yolks and whites with *Saccharomyces cerevisiae* at an initial pH of approximately 7, fermenting the inoculated mixture, and drying the fermented mixture.

6. A process for preparing dried egg products comprising inoculating a whole egg mixture with about 0.2% to about 0.4% by weight of bakers' yeast capable of fermenting reducing sugars, fermenting the inoculated mixture until the removal of reducing sugars, calculated as dextrose, is substantially complete, and drying the fermented mixture.

7. A process for preparing dried egg products which comprises inoculating an egg liquid with *Saccharomyces cerevisiae*, fermenting the inoculated mixture, and drying the fermented mixture.

GEORGE JOSH.
LOUIS A. HARRIMAN.
ERVIN W. HOPKINS.

REFERENCES CITED

The following references are of record in the file of this patent:

UNITED STATES PATENTS

| Number | Name | Date |
|---|---|---|
| 1,818,214 | Epstein et al. | Aug. 11, 1931 |
| 2,056,082 | Tranin | Sept. 29, 1936 |
| 2,212,445 | Littlefield et al. | Aug. 20, 1940 |
| 2,280,147 | Fischer | Apr. 21, 1942 |
| 2,358,324 | Frey et al. | Sept. 19, 1944 |

Certificate of Correction

Patent No. 2,460,986.

February 8, 1949.

GEORGE JOSH ET AL.

It is hereby certified that error appears in the printed specification of the above numbered patent requiring correction as follows:

Column 2, Table 1, seventh column thereof, under the heading "$\genfrac{}{}{0pt}{}{pH}{4hr.}$", for "4.08" read *4.80*;

and that the said Letters Patent should be read with this correction therein that the same may conform to the record of the case in the Patent Office.

Signed and sealed this 28th day of June, A. D. 1949.

[SEAL]

THOMAS F. MURPHY,
*Assistant Commissioner of Patents.*